P. OVERMAN.
DEMOUNTABLE RIM.
APPLICATION FILED OCT. 27, 1915.

1,186,029.

Patented June 6, 1916.

Inventor
Philip Overman
By J. M. Wright
Attorney

UNITED STATES PATENT OFFICE.

PHILIP OVERMAN, OF SAN FRANCISCO, CALIFORNIA, ASSIGNOR OF ONE-HALF TO HERBERT V. TURNER, OF SAN FRANCISCO, CALIFORNIA.

DEMOUNTABLE RIM.

1,186,029.  Specification of Letters Patent.  Patented June 6, 1916.

Application filed October 27, 1915. Serial No. 58,132.

*To all whom it may concern:*

Be it known that I, PHILIP OVERMAN, a citizen of the United States, residing at San Francisco, in the county of San Francisco and State of California, have invented new and useful Improvements in Demountable Rims, of which the following is a specification.

The present invention relates to improvements in that class of demountable rims which are held in position by means of a side ring, the cross section of which is wedge-shaped, and which in turn is held in position by lugs pivoted on screws screwed into a side of the felly and which project radially outward, but which, when the screws are loosened, can be turned to no longer project outward. The detaching of such a rim involves the unscrewing of six or more screws, a tedious operation and one involving the exertion of considerable force.

The object of the present invention is to provide a means for mounting and demounting such a rim more quickly than heretofore.

Figure 1:
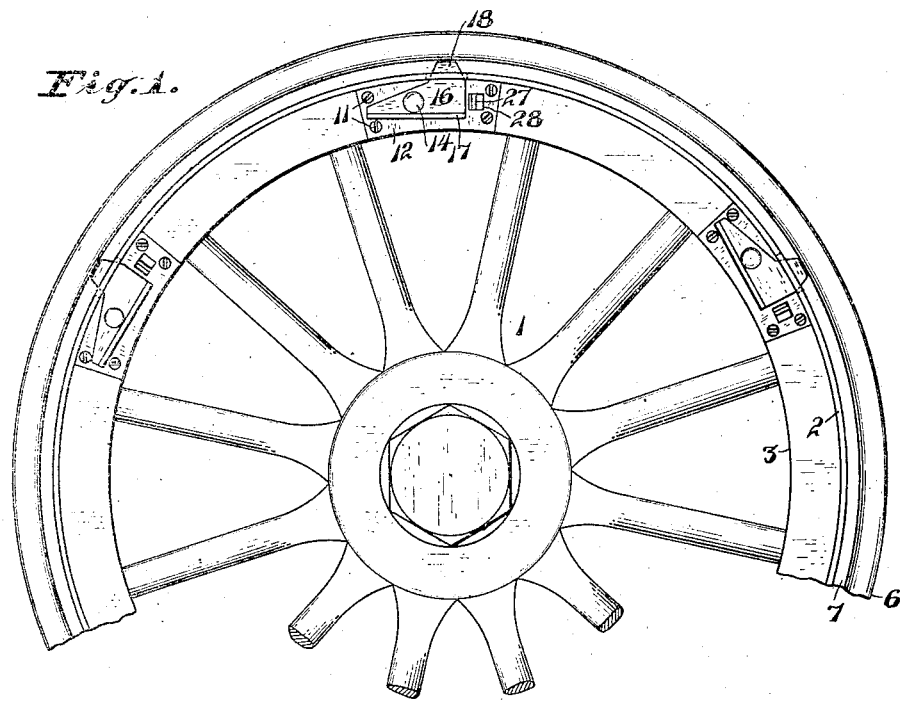
Figure 2:
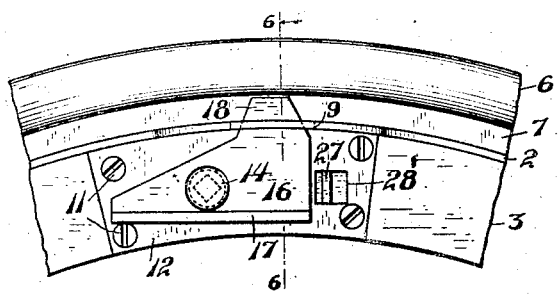
Figure 3:
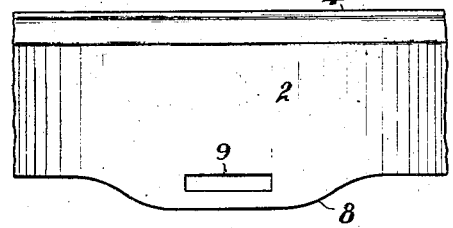
Figure 4:
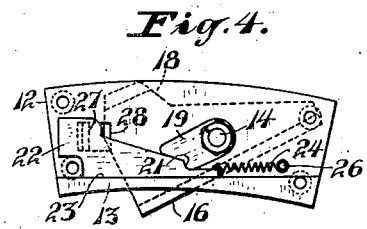
Figure 5:
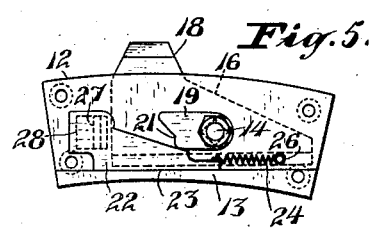
Figure 6:
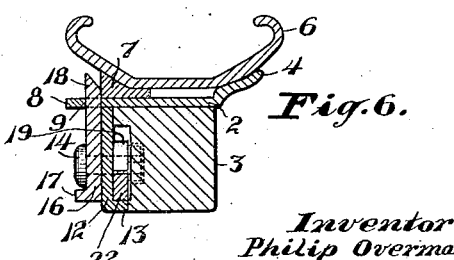

In the accompanying drawings, Figure 1 is a broken side view of a wheel equipped with my improvement; Fig. 2 is an enlarged side view of a portion of the wheel; Fig. 3 is a broken plan view of the felly rim detached; Fig. 4 is an inside view of a locking plate detached, a locking lever being shown in its unlocking position; Fig. 5 is a similar view but showing the locking lever in its locking position; Fig. 6 is a cross sectional view on the line 6—6 of Fig. 2.

Referring to the drawing, 1 indicates an automobile wheel, having a felly rim 2 secured upon the felly 3 of the wheel, and one edge of which is raised, as shown at 4, to form a support at that side for the demountable rim, a demountable rim 6 and a wedging ring 7. The felly rim 2 is formed with a circular series of lateral extensions 8 on the side opposite to the raised portions 4, said extensions having therethrough slots 9 elongated in the direction of the circumference of the wheel. Secured by screws 11 to the side of the felly adjacent to said extensions and over recesses in said side are plates 12, the inner edges of which have inwardly extending flanged portions 13 fitting against the inner edge of the felly, and through said plates extend pivot bolts 14, on each of which is secured, outside the plate, a lever 16, having a broadened inner edge 17, and one end of which lever is formed with a wedge 18, which extends through the slot 9 in the adjacent extension and engages the outer side of the wedging ring 7 and presses it inwardly thus holding in place the demountable rim. Secured to the bolt upon the inner side of the plate is a keeper 19, formed with a shoulder 21 and tapering from said shoulder. 22 indicates a locking wedge, one edge of which abuts against a guideway 23 extending inwardly from said plate, which wedge is normally drawn forward by a coiled spring 24, attached at one end to the narrow end of the wedge and at the other end to a pin 26 secured in said plate. Said wedge has a key 27 extending through the hole 28 in the plate larger than the key, so that a screw driver can be inserted between the key and one side of said hole.

To secure the demountable rim in position each lever in turn is struck with a hammer opposite to the wedge 18 until said wedges 18 are driven outwardly, thus forcing the wedging ring transversely, and tightly securing the rim 6 upon the felly rim. To detach the demountable rim, each wedge in turn is withdrawn against the tension of the spring 24 by means of a screw driver or like instrument inserted through the hole 28 between the finger and one side of the hole, and then twisted so as to withdraw the wedge 22 longitudinally past the shoulder 21 in the retainer. The ends of the levers 16 are then withdrawn through the slots 9 by hammering upon the other ends of said levers. The wedging ring can then be pried out, and, since it is split, can be removed and the demountable rim detached.

It is to be understood that the particular character of the device for locking the wedging lever in position is immaterial.

By this mechanism I provide a rim which can be mounted and demounted in much less time and with much greater ease than heretofore.

I claim:—

1. In combination with a demountable rim, means for securing said rim upon the felly of the wheel, comprising a wedging ring, a circular series of plates secured to said felly, wedging levers pivoted on said plates to swing parallel thereto and engaging the outer side of the wedging ring, the felly rim having slots through which said wedging levers can extend, and means for locking said wedging levers in their wedging position.

2. In combination with a demountable rim, means for securing said rim upon the felly of the wheel, comprising a wedging ring, a circular series of plates secured to said felly, wedging levers pivoted on said plates to swing parallel thereto and engaging the outer side of the wedging ring, the felly rim having slots through which said wedging levers can extend, and spring actuated means for automatically locking said wedging levers in their wedging position.

3. In combination with a demountable rim, means for securing said rim upon the felly of the wheel, comprising a circular series of plates secured to said felly, wedging levers pivoted on said plates, the felly rim having slots through which said wedging levers can extend, spring-actuated means for automatically locking said wedging levers in their wedging position, said means having parts extending through said plate and adapted to be actuated to withdraw the means out of their locking position.

4. In combination with a demountable rim, means for securing said rim upon the felly of the wheel, comprising a circular series of plates secured to said felly, wedging levers pivoted on said plates, the felly rim having slots through which said wedging levers can extend, spring-actuated wedges for locking said wedging levers in their wedging position, said wedges having keys extending through holes in the plates to provide means for withdrawing the wedges from their locking position.

In testimony whereof I have hereunto set my hand in the presence of two subscribing witnesses.

PHILIP OVERMAN.

Witnesses:
F. M. WRIGHT,
D. B. RICHARDS.